Thorp & Lehr.
Brick Machine.

Nº 99,371. Patented Feb. 1, 1870.

Witnesses:
Jno. F. Brooks
Edgar Gate

Inventors
H. D. Thorp
D. G. Lehr
PER
Attys

United States Patent Office.

H. D. THORP AND J. G. LEHR, OF HARLAN, INDIANA.

Letters Patent No. 99,371, dated February 1, 1870.

IMPROVEMENT IN BRICK-MACHINES.

The Schedule referred to in these Letters Patent and making part of the same.

*To all whom it may concern:*

Be it known that we, H. D. THORP and J. G. LEHR, of Harlan, in the county of Allen, and State of Indiana, have invented a new and improved Brick-Machine; and we do hereby declare that the following is a full, clear, and exact description thereof, which will enable others skilled in the art to make and use the same, reference being had to the accompanying drawings, forming part of this specification.

This invention relates to improvements in brick-machines; and consists in an improved arrangement of devices for discharging the moulds, after being filled, from under the machine; also, an improved arrangement of movable and stationary knives in the mud-mill, above the paddles, for facilitating the grinding and mixing; and also, an improved adjusting-arrangement for raising or lowering the mould-supporting table.

Similar letters of reference indicate corresponding parts.

The bottom A, of the mud-holding cylinder, is provided with two rows of discharge-openings, B, for delivering the clay into the mould-boxes, which are fed in by hand, through the trough C, above the mould-box holding-table D.

E is a vibrating mould-box push-bar, passing under the bottom A of the mud-cylinder, between the two sets of discharge-orifices, and extending beyond the cylinder at each end, where it is connected to slide-bars F, arranged in suitable guides on the frame, and connected, by rods G, to a set of vibrating arms, H, on opposite sides of the frame, pivoted at I, and rising above the top of the tub, where they are provided with friction-rollers K.

Each set is connected above the cylinder, by rods L, which, together with the rods G, at the bottom, so connect the levers that one set cannot vibrate without a corresponding movement of the other.

M is a cam-wheel on the sweep N of the mud-mill, arranged to act alternately on each vibrator, forcing one outward, and the other inward, at the same time. This imparts a movement to the push-rod E, first one way and then the other, and between each movement, a mould-box is fed in, so that one half the boxes are moved to one side, under one set of orifices, and the other half to the other side, and the filled boxes are discharged by the empty ones, as the latter are pushed up to the positions for filling, under the orifices. Each revolution of the sweep and mixing-paddles fills two sets of moulds, and discharges them, and supplies two other sets.

Figure 1:
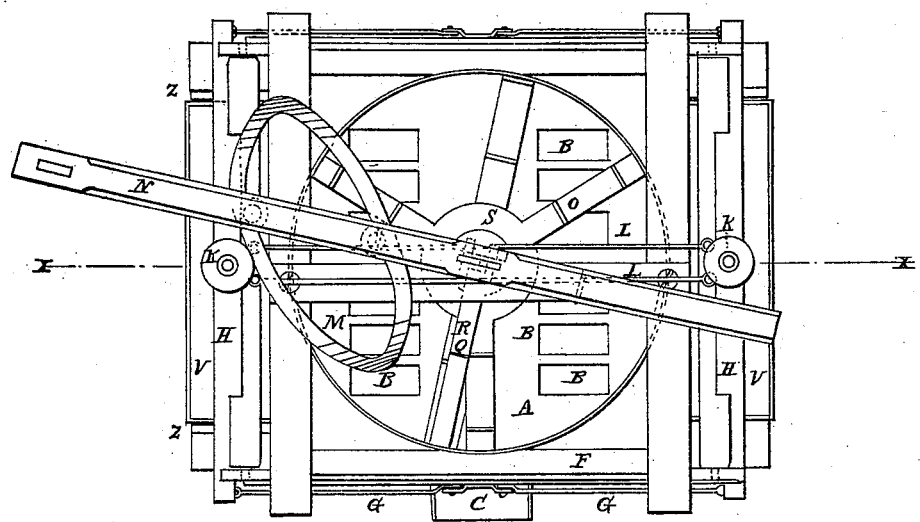
Figure 1 represents a plan view of our improved machine.
Figure 2:
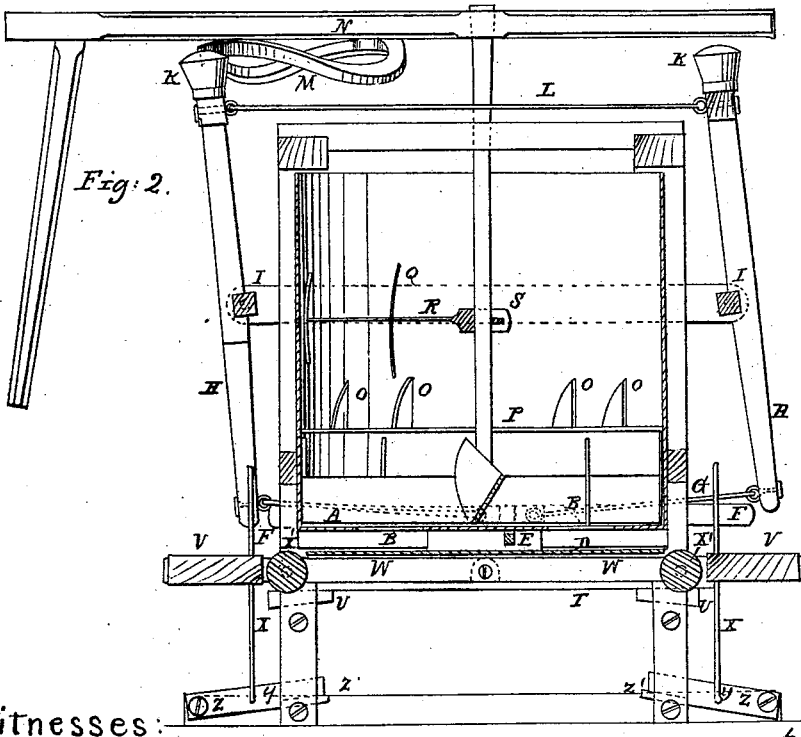
Figure 2 represents a sectional elevation, taken on the line $xx$ of fig. 1.

We provide, in the mixing-tub, a set of permanent cutters, O, supported on suitable transverse bars, P, and other sets of movable cutters, Q, on arms R, which are slotted in the ends, for connection to the square shafts, by placing them thereon, so as to receive them in the said slots, and securing them by keys, driven through mortises behind the shaft, as clearly shown at S, fig. 2.

This mode of attachment facilitates the removal and re-attachment of the said arms, without disturbing the shaft.

The mould-box supporting-table A rests on bars T, fitted at each end into vertical slots in the posts, and capable of adjustment up or down therein, and to be supported, at any required height, by keys U, for making bricks of different thicknesses.

V represents delivering-tables, for the reception of the mould-boxes as they are shoved off the table, and from which they are taken away, in any suitable or preferable way.

They are supported on bars W, pivoted to the bars T at the centre, and resting near their outer ends on shoulders of the bent rods X, journaled at Y, to the blocks Z, pivoted at one end to the base of the frame, and at the other, working for adjustment in vertical slots in the posts in which keys Z' are used, to vary their height.

These bent rods X are used for varying the position of the tables V, as the table D is varied.

X' represents rollers in rear of the tables V, to facilitate the delivery of the mould-boxes.

Having thus described our invention,

We claim as new, and desire to secure by Letters Patent—

The levers H and conical rollers K, constructed and arranged as set forth, in combination with a cam-wheel, M, as and for the purpose specified.

H. D. THORP.
J. G. LEHR.

Witnesses:
    JESSE GRANAWALT,
    A. H. BITTINGER,
    JAMES WILSON.